United States Patent
Kosonen et al.

(10) Patent No.: US 9,145,496 B2
(45) Date of Patent: Sep. 29, 2015

(54) COMPOSITE PRODUCT, A METHOD FOR MANUFACTURING A COMPOSITE PRODUCT AND ITS USE, A MATERIAL COMPONENT AND A FINAL PRODUCT

(75) Inventors: Harri Kosonen, Lappeenranta (FI); Kari Luukko, Espoo (FI); Sami Turunen, Lappeenranta (FI); Jere Salminen, Lappeenranta (FI); Stefan Fors, Kausala (FI); Petri Myllytie, Vääksy (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/358,554

(22) PCT Filed: Nov. 5, 2011

(86) PCT No.: PCT/FI2011/051004
§ 371 (c)(1),
(2), (4) Date: May 15, 2014

(87) PCT Pub. No.: WO2013/072547
PCT Pub. Date: May 23, 2013

(65) Prior Publication Data
US 2014/0303290 A1  Oct. 9, 2014

(51) Int. Cl.
| | | |
|---|---|---|
| *C08L 1/00* | (2006.01) |
| *B29C 47/00* | (2006.01) |
| *C08L 25/06* | (2006.01) |
| *C08L 97/02* | (2006.01) |
| *C08L 1/02* | (2006.01) |
| *C08L 23/06* | (2006.01) |
| *C08L 23/12* | (2006.01) |

(52) U.S. Cl.
CPC . *C08L 25/06* (2013.01); *C08L 1/02* (2013.01); *C08L 23/06* (2013.01); *C08L 23/12* (2013.01); *C08L 97/02* (2013.01); *C08L 2205/14* (2013.01)

(58) Field of Classification Search
USPC .......................................................... 524/35
See application file for complete search history.

(56) References Cited

U.S. PATENT DOCUMENTS

| | | | |
|---|---|---|---|
| 6,582,640 B2 * | 6/2003 | Willemse ...................... 264/119 |
| 2004/0043217 A1 | 3/2004 | Dezutter et al. |
| 2007/0027234 A1 * | 2/2007 | Sigworth et al. ................ 524/13 |
| 2009/0126307 A1 | 5/2009 | Grohman et al. |
| 2009/0264560 A1 * | 10/2009 | Warnes et al. .................. 524/13 |

FOREIGN PATENT DOCUMENTS

| | | |
|---|---|---|
| EP | 1 070 782 | 1/2001 |
| WO | WO 94/11176 A1 | 5/1994 |
| WO | WO 00/58028 A1 | 10/2000 |
| WO | WO 2006/001717 A1 | 1/2006 |
| WO | WO 2007/016277 A1 | 2/2007 |
| WO | WO 2007/056308 A1 | 5/2007 |
| WO | WO 2007/056839 A1 | 5/2007 |
| WO | WO 2007/073218 A1 | 6/2007 |
| WO | WO 2010/078640 A1 | 7/2010 |
| WO | WO 2010/122224 A1 | 10/2010 |

OTHER PUBLICATIONS

Katz et al., Handbook of Fillers for Plastics, 1987.*
Balasuriya et al., "Mechanical Properties of Wood Flake-Polyethylene Composites. Part 1: Effects of Processing Methods and Matrix Melt Flow Behaviour," *Composites: Part A*, 2001, vol. 32, pp. 619-629.
Balasuriya et al., "Mechanical Properties of Wood Flake-Polyethylene Composites. II. Interface Modification,"*Journal of Applied Polymer Science*, 2002, vol. 83, pp. 2505-2521.
International Search Report issued in International Patent Application No. PCT/FI2011/051004 mailed Jul. 25, 2012.
Written Opinion of the International Searching Authority issued in International Patent Application No. PCT/FI2011/051004 mailed Jul. 25, 2012.
Written Opinion of the International Searching Authority issued in International Patent Application No. PCT/FI2011/051004 mailed Oct. 15, 2013.
International Preliminary Report on Patentability issued in International Patent Application No. PCT/FI2011/051004 mailed Feb. 21, 2014.

* cited by examiner

*Primary Examiner* — Hui Chin
(74) *Attorney, Agent, or Firm* — Oliff PLC

(57) ABSTRACT

The invention relates to a composite product. According to the invention, the composite product contains a polymer based material and an organic natural fiber material, and the organic natural fiber material has a form, and the form of fibers of the organic natural fiber material is a flake, and the organic natural fiber material in the form of the flakes has been mixed with the polymer based material. Further, the invention relates to a method for manufacturing a composite product, a material component, a use of a composite product and a final product.

16 Claims, 5 Drawing Sheets

COMPOSITE PRODUCT, A METHOD FOR MANUFACTURING A COMPOSITE PRODUCT AND ITS USE, A MATERIAL COMPONENT AND A FINAL PRODUCT

FIELD OF THE INVENTION

The invention relates to a composite product. Further, the invention relates to a method for manufacturing a composite product. Further, the invention relates to a material component, a final product and a use of the composite product.

BACKGROUND OF THE INVENTION

Known from prior art are different wood-polymer composites which are formed from wood-based material and polymers typically by an extrusion.

OBJECTIVE OF THE INVENTION

The objective of the invention is to disclose a new composite product. Another objective of the invention is to disclose a new method for manufacturing a composite product. Another objective of the invention is to produce a new final product.

SUMMARY OF THE INVENTION

The composite product according to the present invention is characterized by what is presented in claim 1.

The method for manufacturing a composite product according to the present invention is characterized by what is presented in claim 17.

The material component according to the present invention is characterized by what is presented in claim 20.

The final product according to the present invention is characterized by what is presented in claim 21.

The use of the composite product according to the present invention is characterized by what is presented in claim 23.

BRIEF DESCRIPTION OF THE FIGURES

The accompanying figures, which are included to provide a further understanding of the invention and constitutes a part of this specification, illustrate some embodiments of the invention and together with the description help to explain the principles of the invention. In the figures.

DETAILED DESCRIPTION OF THE INVENTION

Figure 1:
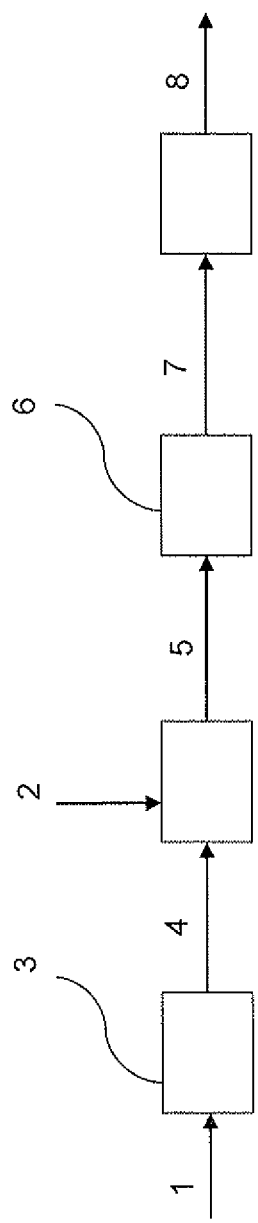
FIG. 1 is a flow chart illustration of a method according to one embodiment of the present invention.

In the present invention a composite product is formed. According to the invention the composite product contains a polymer based material and an organic natural fiber material, and the organic natural fiber material has a form, and the form of the organic natural fiber material is a flake, and the organic natural fiber material in the form of the flakes has been mixed with the polymer based material to form a mixture, and the composite product is formed from the mixture.

In this context, a composite product is preferably an intermediate product, which is used in a post processing, e.g. by melting, e.g. in an injection moulding or extrusion. In one embodiment a composite product can be used as a final product.

In this context, an organic natural fiber material (later disclosed also as a fiber material) refers any natural material or composition containing fibers, e.g. wood based fibers, plant based fibers, viscose fibers and the like. The organic natural fiber material can include natural fibers as such and/or natural fiber based processed fibers. The organic natural fiber material may contain one or more fiber material components. Preferably, the organic natural fiber material contains at least one fiber based component. In one embodiment the fiber material are based from cellulose. In one embodiment the fiber material contains cellulose fibers. In one embodiment the fiber material contains organic natural fibers and/or parts of fibers. The fiber material may include any natural organic fibers and/or parts of fibers, such as wood fibers, plant fibers and/or their parts and components. In one embodiment the fiber material is in the form of fibers, components and parts of fibers, and/or flakes or their combinations. The fiber material may be modified chemically.

In one embodiment the organic natural fiber material is formed from an organic natural starting material by crushing before the mixing. In this context, the organic natural starting material refers any material or composition containing fibers. In one embodiment the organic natural starting material contains cellulose. The organic natural starting material may contain one or more starting material components. In one embodiment the fiber material is separated from the organic natural starting material. In one embodiment the starting material is modified mechanically and/or chemically. In one embodiment the starting material is in the form of sheet or web or compacted fiber matrix or pieces of compacted fibers, or large fiber or fiber bundles.

In one embodiment the organic natural starting material is selected from pulp based material, mechanical pulp, CMP, TMP, wood flour, sawdust, chip material, cellulose, derivates thereof and their combinations. In one embodiment the organic natural starting material contains pulp based material, e.g. wood or chemical pulp based material. In one embodiment the organic natural fiber material is formed from wood pulp based material. In one embodiment the organic natural fiber material is formed from chemical pulp based material. In one embodiment the organic natural fiber material is formed from chemical pulp based material made from wood. In one embodiment the pulp based material is formed from material selected from the group consisting of pulp board, pulp sheet, roll of pulp, crushed pulp material, derivates thereof and their combinations.

Polymer based material can contain any suitable polymer or polymer composition. In one embodiment the polymer based material is thermoplastic. In one embodiment the polymer based material includes thermoplastic components. In one embodiment the polymer based material is selected from the group consisting of polyolefin, e.g. polyethylene and polypropylene, polystyrene, polyamide, ABS (acrylic nitrile butadiene styrene copolymer), polycarbonate, biopolymer, e.g. polylactide, their derivatives and their combinations. In a preferable embodiment the polymer based material is selected from the group consisting of polyethylene, polypropylene and their combinations. The polymer based material may contain one or more polymer material components. Further, the polymer based material may contain additives and/or fillers, if desired. In one embodiment melt flow rate, MFR, of the polymer based material is under 1000 g/10 min (230° C., 2.16 kg defined by ISO 1133), more preferable 0.1-200 g/10 min, most preferable 0.3-150 g/10 min. In one embodiment melting point of the polymer based material is under 250° C., preferably under 220° C., and more preferable under 190° C.

Preferably, the fiber material is mixed with the polymer based material to form a mixture. In one embodiment suitable and desired additives can be added into the starting material, the fiber material and/or the mixture.

In one embodiment moisture of the fiber material is under 5%, preferably under 4%, more preferable under 3% and most preferable under 2%, before the mixing with polymer based material.

In one embodiment the composite product includes the organic natural fiber material 40-60%, and dry composite product absorbs moisture under 1.5% from the weight of the composite product in the time 30 hours (50% RH and 22° C. atmosphere). In one embodiment the composite product includes the organic natural fiber material 20-40%, and dry composite product absorbs moisture under 1.3% from the weight of the composite product in the time 30 hours (50% RH and 22° C. atmosphere). In one embodiment moisture uptake from the atmosphere can be measured from the dry composite products. Before the measurement the composite products has to be dried. Composite product should be dried at temperature of 120° C. for 48 hours before the measurement. In all cases the drying temperature should be at least 10° C. lower that the glass transition or melting temperature of the polymer. If the drying temperature is lower than 110° C., we should use as high drying temperature as possible, vacuum oven (vacuum level preferable below 0.01 mbar), and drying time of 48 hours. For the moisture uptake measurement at least 10 grams of products will be placed on the plate. There should be only one granulate layer on the plate. Moisture uptake will be then measured as a weight increase compared to the weight of dry products. So if the weight of dry composite product increase from 10.0 g to 10.1 g, will the result be 1.0% In these measurements conditions are: Temperature is 22° C. and moisture content of air is 50% RH. Different measurement times can be used depending on the need.

In one embodiment the pore volume of the mixture is under 10%, preferably under 5%, more preferable under 2% and most preferable under 1%.

In one embodiment the theoretical density of the mixture consisting of fiber material and polymer based material is between 930-1600 kg/m$^3$, preferably between 1000-1500 kg/m$^3$. The theoretical density varies depending on components of the mixture and their densities.

Due to the hygroscopic character of organic natural fibers the fibers typically contain moisture. The moisture content of the fibers depend, for example, on the origin of the fibers, on the storing conditions of the fibers, e.g. relative humidity and temperature of the surroundings where the fibers are stored, and on the processing of the fibers. Typically, the presence of moisture cannot be fully excluded while processing organic natural fibers, and in some cases excess moisture can be harmful. In the case of organic natural fiber and thermoplastic or other polymer composites the presence of moisture in processing can cause, for example, deterioration of product properties such as mechanical strength and visual appearance. Processing temperatures of organic natural fiber-thermoplastic/polymer composites are typically above the boiling point of water due to the higher than 100° C. melting and/or glass transition temperatures of thermoplastic/polymers. In processing of organic natural fiber-thermoplastic/polymer composites at temperatures above boiling point of water the vaporization of moisture contained in the fibers can cause formation of porosity into the product material. The porosity can appear, for example, in the form of gas bubbles or as voids between fiber surfaces and matrix polymer in the composite product. Another reason for formation of porosity can be inclusion of air or other surrounding gases during processing due to insufficient gas removal in the process. Especially, feeding of reinforcement fibers bring a large volume of gases to be removed in the process. For example, in preparation of organic natural fiber—thermoplastic/polymer composites by compounding extrusion sufficient venting is necessary in order to remove gaseous substances including water vapor, entrained air and other gases, and other volatile components. Formation of porosity into the product material reduces the density of the product material. Ideally, there is no unwanted porosity in the product material. In practice, some porosity may exist no matter how good the process is in regard to minimizing the formation of porosity. Therefore, density can be used as one quantity for characterization of organic natural fiber-thermoplastic/polymer composite material. A composite material can be characterized by its theoretical/calculatory density and its experimental density. Theoretical/calculatory density ($\rho_t$) of a composite material is calculated from the masses and the densities of each individual component according to equation 1:

$$\rho_t = (m_1 + m_2 + \ldots + m_n) / \left( \frac{m_1}{\rho_1} + \frac{m_2}{\rho_2} + \ldots + \frac{m_n}{\rho_n} \right) \qquad \text{Eq. (1)}$$

where $m_1$, $m_2$, and $m_n$ are the masses of each individual component of the composite material, e.g. the composite product or the mixture containing fiber material and polymer based material, and $\rho_1$, $\rho_2$, $\rho_n$ are the densities of each individual component of the composite material, e.g. the composite product or the mixture containing fiber material and polymer based material.

In one embodiment the density of the mixture is at least 85%, preferably over 90%, more preferable 95% and most preferable over 98% of the theoretical density.

In one embodiment the mixture includes 10 to 90% fiber material, preferably 20 to 80% fiber material, more preferable 30 to 70% fiber material.

In one embodiment the fiber material is at least partly in the form of flakes after the crushing. In one embodiment the fiber material contains flake-form fiber material at least 30%, preferably at least 50% and more preferable at least 70%. In one embodiment the fiber material is mainly in the form of flakes after the crushing.

In one embodiment a special material component is formed, preferably for using in manufacturing a composite product. In one embodiment the material component is formed from organic natural starting material, such as pulp based starting material e.g. chemical pulp, by the crushing. In one embodiment the material component can be in the form of fibers, fragments of fibers, flakes or their combinations. In one embodiment the material component is in the form of flakes. In one embodiment the material component includes mainly fiber material. In one embodiment the material component can be used in mixing with polymer based material. In one embodiment the material component is used in manufacturing of a composite product, a final product or their combinations. In one embodiment the material component of the present invention is used as a final product.

Figure 5:
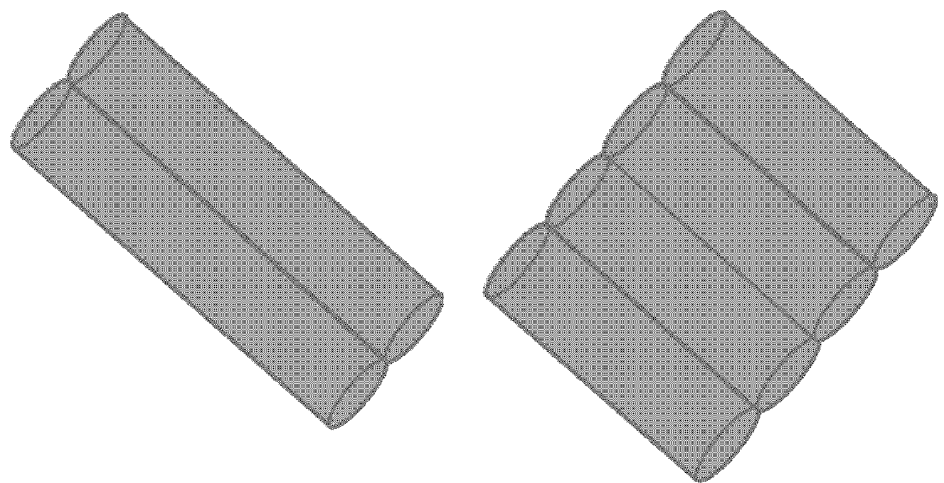
FIG. 5 represents two illustrations of flake structures, which contain two fibres and four fragments of fibres.

In one embodiment the flake contains at least fragments of fiber. Preferably, the flake can include at least one fiber or at least one fragment of the fiber. In a preferred embodiment the flake includes at least two fibers and/or fragments of the fibers jointed together. The flake can be formed from one part or several parts of fibers bound together. The flake can be formed directly in the flake process or afterwards by reuniting smaller particles. The flake or elongated flake has high aspect ratio and low sphericity and shape factor. These parameters are calculated based on equations 2, 3 and 4. The intermediate dimensions are in these calculations approximately same than width due to relatively low shortest dimension. In FIG. 5 it is represented fibers and/or fragments of the fibers jointed together.

In one embodiment shape factor is determined by means of the equation:

$$SF = \frac{d_S}{\sqrt{d_L d_I}} \quad \text{(Eq. 2)}$$

where
SF is shape factor
$d_S$ is the shortest dimension of the particle
$d_I$ is the intermediate dimension of the particle
$d_L$ is the longest dimension of the particle
In one embodiment shape factor of the flake is between 0.05 to 0.09.

In one embodiment sphericity is determined by means of the equation:

$$S = \sqrt[3]{\frac{d_S d_I}{d_L^2}} \quad \text{(Eq. 3)}$$

where
S is sphericity
$d_S$ is the shortest dimension of the particle
$d_I$ is the intermediate dimension of the particle
$d_L$ is the longest dimension of the particle
In one embodiment sphericity of the flakes is less than 0.2. In one embodiment sphericity of the flakes is between 0.05-0.2, preferably between 0.1-0.15 and more preferable between 0.11-0.14.

Figure 4:
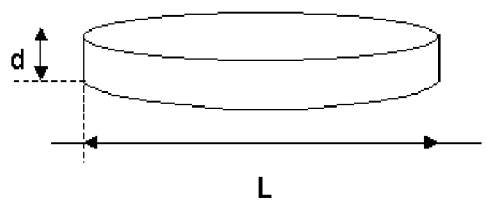
FIG. 4 represents aspect ratio of platy particle in which d is particle thickness and L is particle width.

Aspect ratio can be informed many ways like a ratio of particle perimeter to particle area or a maximum dimension to minimum dimension. With the pigments the aspect ratio means typically a ratio of the particle width L, to the particle thickness d as in FIG. 4. In one embodiment aspect ratio is determined by means of the equation:

$$A_r = \frac{d_L}{d_S} \quad \text{(Eq. 4)}$$

where
$A_r$ is aspect ratio
$d_S$ is the shortest dimension of the particle
$d_L$ is the longest dimension of the particle
In one embodiment aspect ratio relating to ratio of the length to the width is between 10 and 40. In one embodiment aspect ratio relating to ratio of the length to the thickness is between 50 and 100.

In one embodiment the width of the flake is under 500 μm, preferably under 200 μm, more preferable under 50 μm.

In one embodiment the thickness of the flake is under 30 μm, preferably under 20 μm, more preferable under 15 μm, more preferable under 10 μm and most preferable under 7 μm.

In one embodiment the width of the flake is at least 2, preferably at least 2.5, more preferable at least 3, times the thickness of the flake.

In one embodiment the length of the flake is at least 10 times the width of the flake.

In one embodiment the flake has a tabular shape. In one embodiment the flake has a platy shape.

In one embodiment the production or part of flake production can be said to be micronisation of material. Micronisation is generally accepted as size reduction of particles into 1-30 μm in diameter. However, in this content the concept is broadening so that the smallest dimension of particle is 1-100 μm.

There is a lot of microparticles which has flake form. There are a lot of possibilities to produce this kind microparticles with flake form without any milling. Different non-milling techniques have also variety of chances as post- or pre-treatment in milling microparticles. These techniques can be categorized as physical treatment, like use of high-intensity ultrasound, microwave-assisted extraction and supercritical fluid extraction and as chemical treatment, like use of ionic liquids or acid hydrolysis in the case of wood. The categorizing of the treatment is decided due to working principle of the method. For example by using high-intensity ultrasound the wanted errand would be catalysing effect of reaction (chemical effect) but the working principle is to use of highly energetic ultrasound that transfers energy (physical treatment) to reactants.

Mill design and mode of operation define the type of stress, normal or tangential, stress intensity and stressing frequency distributions exerted to the particles point. The required fineness determines how high stress intensity, depending on mill, is necessary to impose into particles: a hammer mill for coarser fractions and a fluid energy mill for finer fractions.

In one embodiment flakes has been done by crushing. There are several different mill types for crushing of the organic natural fiber material. In this context crushing has been done by hammer mills, universal mills, pin mills, cutting mills, crushers, mechanical mills with internal classifier, high-compression and table roller mills, jet mills, dry media mills and wet media mills. Also machines which are called cryogenic mills, colloid mill, ball mills, impact mills, stirred mills, screen mills and drum mills can be used in size reduction of materials. High-compression roller and table roller mills alongside with jet, dry-media and wet-media mills are found to be capable for micronisation processes, but basically some micro particles are formed in all processes.

In one method embodiment flake material is made such way that starting material is so well controlled that very precise flake like material is formed.

In one method embodiment flake material is made such way that starting material is so well controlled that very precise flake like material is peeled off or cut.

In one method embodiment flake material is made such way that starting material is so well controlled that very precise flake like material is peeled off or cut, when well controlled feeding makes well controlled micronization possible. When starting material is supported and cellulose is peeled off so controlled way that very thin layers of cellulose material, flakes are formed.

In one embodiment the flakes are classified to get desired particles.

In one embodiment the starting material is modified mechanically and/or chemically. In one embodiment the starting material is chemical pulp. In one embodiment the starting material is in the form of sheet or web or compacted fiber matrix or pieces of compacted fibers, or large fiber or fiber bundles.

Technical effects of the flake material are fluency and ability to flow and non-arching.

In one embodiment the fiber of the fiber material has shape ratio relating to ratio of the fiber length to the fiber thickness is at least 30.

In the method of the present invention, a composite product is formed so that a polymer based material and an organic natural fiber material are selected, and the organic natural fiber material has a form, and the form of fibers of the organic natural fiber material is a flake, and the organic natural fiber material in the form of the flakes is mixed with the polymer based material to form the composite product.

In one embodiment the fiber material is pretreated in a pre-treatment stage after the crushing. In one embodiment the method comprises at least one pre-treatment stage. In one embodiment the pre-treatment stage contains at least one step which is selected from the group consisting of heating, cooling, mixing, heat-cool mixing, agglomeration, pre-granulation, pelleting and their combinations. In one embodiment polymer based material is mixed with the fiber material during the pre-treatment. In one embodiment the mixing is carried out by a heat-cool mixer, internal mixer, e.g. Banbury, continuous mixer or other suitable device.

In the heat-cool mixer the fiber material and polymer based material can be mixed and agglomerated to homogeneous compound. The fiber content is adjustable within a wide range, and high contents are easy to achieve.

In a preferred embodiment, the fiber material of the starting material is incorporated to polymer based material without compression and pressure. In one embodiment the fiber material is mixed with polymer based material without compression to form a mixture. In one embodiment the fibers of the fiber material are treated without compression between the crushing and the mixing with polymer based material. In one embodiment pressure in blending is between 0-100 bar. Preferably, such pressure is used that bonds between fibers are not formed, i.e. the mixing of the fiber based starting material and polymer based material is made without forming of the bonds between fibers of the fiber material.

In one embodiment fiber bulk density of the fiber material is under 300 kg/m$^3$, in one embodiment under 150 kg/m$^3$, in one embodiment under 100 kg/m$^3$, and in one embodiment under 70 kg/m$^3$. Then the fiber material can be incorporated to polymer based material easily.

In one embodiment desired additives and/or fillers are added into the mixture of the fiber material and polymer based material. In one embodiment an additive is selected from the group consisting of property enhancers, coupling agent, adhesion promoter, lubricant, rheology modifiers, releaser agent, fire retardant, coloring agent, anti-mildew compound, protective agent, antioxidant, uv-stabilizer, foaming agent, curing agent, coagent, catalyst and their combinations. In one embodiment filler is selected from the group of fibrous material, organic fillers, inorganic fillers, powdery reinforcements, talc, wood fibers, natural organic fibers and their combinations.

In one embodiment the composite product is in the form of particles. In this invention particle refer to any granulate, agglomerate, pellet or the like. In one embodiment the composite product is in the form of granulates. In one embodiment the composite product is formed by a granulation method. In this context, the granulation method refers to any granulation method, pelleting method, agglomeration method or their combinations.

In a preferred embodiment the sizes of the granulates are in the same range. The weight of the granulate is 0.01-0.10 g, and in one embodiment more, and in one embodiment less. Preferably, the weight of the granulates is 0.015-0.05. Hundred granulates weight is 1-10 g. Preferably, the weight of the 100 granulates is 1.5-5 g. More preferable the weight of 100 granulates is 2.5-4.5 g. Standard deviation is under 10%, preferably under 5%, more preferable under 2%.

In one embodiment the composite product is formed by the method selected from the group consisting of extrusion, granulation, mixing method, pelletization and their combinations. In one embodiment the composite product can be formed by means of mixing device, internal mixer, kneader, pelletizer, pultrusion method, pull drill method, extrusion device or their combinations.

In one embodiment of the invention a mixture containing fiber material and polymer based material is extruded. In one embodiment the mixture is extruded after a pre-treatment. In one embodiment the fiber material is supplied into the extrusion directly after the crushing. In one embodiment the polymer based material is mixed with the fiber material in connection with the extrusion without the pre-treatment stage. In the extrusion any suitable single-screw extruder or twin-screw extruder, such as counter-rotating twin-screw extruder or co-rotating twin-screw extruder, may be used. In one embodiment different pelleting tools can be used in connection with the extruder. In one embodiment extrusion stage comprises a granulation step. In one embodiment the granulation step is arranged after the extrusion. In one embodiment the granulation step is a separate stage after the extrusion stage.

In one embodiment the granulation is carried out by means of a method selected from the group consisting of water ring, underwater pelleting, air cooled, hot face and their combinations. In one embodiment the granulation is made under water. In one embodiment the granulation is carried out by means of counterpressure, e.g. with underwater method.

In one embodiment the granulates of the composite product are used in the forming of the final product.

A technical effect is to provide homogeneous free-flowing granulates. An additional technical effect is to produce granulates for further processing. It is important for the invention that good compounding is achieved between the organic natural starting material, e.g. the fiber material, and polymer based material.

The main task of granulating, or pelleting, is to produce homogeneous free-flowing granulates for further processing. In several processes, e.g. extrusion and injection moulding, easily dosable granulates are required for good production. Pre-granulation is more important when organic natural fibers are used. Natural fiber plastic granulates can be manufactured with different methods. The most important part of granulating organic natural fiber composite is not necessarily granulate production, but good compounding of the material components, e.g. components of natural fiber and polymer based materials.

Production of granulates have two important targets: compounding and forming of granulates. These can be made with one machine or with different machines. Simplest way to produce natural fiber-polymer granulates is to use one machine which compound material components and forms this material to granulates. One example of this kind of machine is compounding twin screw extruder with granulation tool. Pretreated material components are fed into compounding extruder at the beginning of the screws so melting can start as soon as possible. Material components could be polymer, e.g. plastic, natural fibers, additives and fillers. In some cases, fibers can be fed later to avoid fiber break-ups. Adding fibers later into extruder can also affect dispersion of fibers and plastic. Polymer is melted mainly with friction, but some external heat can be used. Polymer, additives and fibers are mixed when they are moving through screw barrel. Melt compound is pressed through granulation tool, which is for example underwater pelletizer, and granulate is formed.

Compounding can also be done with different machine than granulate forming. Compounding can be made with e.g. extruders, which can be divided into single, twin or multiple screw machines. The single screw can be with smooth, grooved or pin barrel machine. The twin screw extruder can be conical co-rotating twin screw extruder, conical counter-rotating twin screw extruder, parallel co-rotating twin screw extruder, parallel counter-rotating twin screw extruder. The multiple screw extruders can be with rotating or static center shaft. Compounding can be done also with mixers like internal mixer, heating-cooling mixer or z-blade mixer, or with whatever mixing device where polymer is melted with friction or internal heat and fibers are incorporated to polymer and other components. The mixing can be batch or continuous process. The mixing can happen in low or high rotation speed; where low is 10 rpm and high e.g. 2000 rpm. Compounding can be done with any of these or combination of these and some other process steps. Any of mixers or extruders might contain some pre or post processing directly included to extruder or mixer or by connecting shortly before or after extruder. For example, shredding, drying, mixing or their combinations can be done in continuous process directly connected to extruder.

Forming of granulates is usually made with granulation tool which is attached to extruder or melt pump. Granulating tool can be either a cold face cutter or a hot face cutter. In cold face cutter composite granulates are formed when plastic is in solid form. One example of cold face cutter granulating tool is strand pelletizer. In hot face cutter granulates are cut in melt form at the die plate. Hot face cutter pelleting units can be divided into three categories: cutting and cooling in the air, cutting and cooling in water or cutting in the air and cooling in water.

In one embodiment, the granulates are finish-treated. Finish-treatments for granulates are for example drying, dust removing and packing.

In one embodiment the composite product is natural fiber-polymer composite product. In one embodiment a composite product is formed wood based material and polymer based material. According to the invention the wood based material is formed from pulp based starting material containing cellulose fibers, and the starting material has been crushed by grinding, and the wood fiber material is mixed polymer based material. In one embodiment the pulp based starting material is formed from material selected from the group consisting of pulp board, pulp sheet, roll of pulp, crushed pulp material, derivates thereof and their combinations. In one embodiment the pulp based starting material is mixed with polymer based material without compression to form a fiber-polymer mixture. In one embodiment desired additives may be added into the mixture.

In one embodiment the composite product is used in manufacturing of a final product. In one embodiment the composite product of the present invention is used as a final product. The final product may be manufactured from the composite product, e.g. granulates, by any suitable method, for example by an injection moulding, re-extrusion, profile extrusion or the like.

The present invention provides composite products and final products with good quality. The method of the present invention offers a possibility to prepare the products from the organic natural starting material cost-effectively and energy-effectively. The present invention provides composite products and final products with good quality.

The present invention provides an industrially applicable, simple and affordable way of making the composite products and final products from the organic natural starting material. The method according to the present invention is easy and simple to realize as a production process.

The method according to the present invention is suitable for use in the manufacture of the different products from different organic natural starting materials.

EXAMPLES

The invention is described in more detail by the following examples with reference to accompanying figures.

Example 1

Figure 2:
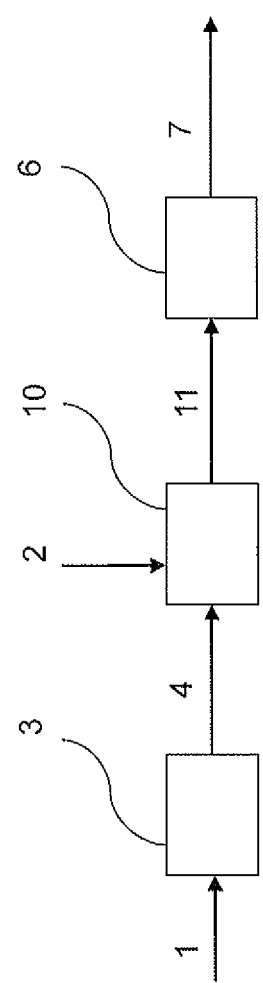
FIG. 2 is a flow chart illustration of a method according to another embodiment of the present invention.

In this example, which is shown in FIG. 2, a composite product is formed from organic starting material (1) and polymer based material (2). The organic natural starting material is pulp based material. Polymer based material is polyethylene.

The organic natural starting material (1) is crushed to form a fiber material (4) and after the crushing (3) the fiber material (4) is pre-treated by a heat-cool mixing (10) in which agglomerates (11) are formed. Polymer-based material (2) is added into the fiber material (4) of the starting material (1) in connection with the heat-cool mixing (10). The agglomerates (11) containing the fiber material and polymer-based material are fed in the extrusion stage (6) in which the composite product (7) is formed.

Example 2

Figure 3:
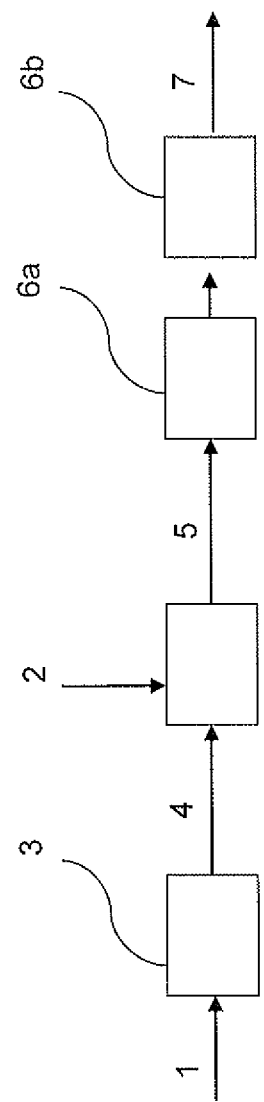
FIG. 3 is a flow chart illustration of a method according to another embodiment of the present invention.

In this example, which is shown in FIG. 3, a composite product (7) is formed from a mixture (5) containing fiber material (1) and polymer based material (2) by an extrusion stage (6a-b).

In the extrusion stage (6) the mixture (5) is extruded in the extrusion step (6a) and granulated in the granulation step (6b). In the granulation is used counterpressure.

Example 3

One example of this kind of machine is compounding with co-rotating twin screw extruder with strand pelletizing. Material components are fed into main feed of compounding extruder at the beginning of the screws so melting can start as soon as possible. Material components are polypropylene, slightly modified cellulose fiber from birch tree, coupling agent and lubricant in ratio 30:66:3:1. Polymer is melted mainly with friction, but some external heat can be used. Polymer, additives and fibers are mixed when they are moving through screw barrel. Melt compound is pressed through die plate, when strand is formed. The strand is cooled by air and conveyed to granulator, where granules with diameter 3.5 mm and length from 1 to 5 mm is formed.

Example 4

One example of this kind of machine is compounding with conical counter-rotating twin screw extruder with under water pelletizing tool. Material components are fed into main feed of compounding extruder at the beginning of the screws so melting can start as soon as possible. Material components are polyethylene, slightly modified cellulose fiber from Conifer tree, coupling agent and mineral filler $CaCO_3$ in ratio 50:40:3:7. Polymer is melted mainly with friction, but some external heat can be used. Polymer, additives and fibers are mixed when they are moving through screw barrel. Melt compound is pressed through die plate to water in chamber, where cutting tool is forming pellets with diameter 4.2 mm and length 4 mm from the melt strand.

Example 5

One example of this kind of machine is compounded with single screw extruder with screening unit and water ring pelletizing tool. Material components are fed into main feed of extruder at the beginning of the screws so melting can start as soon as possible. Material components are polystyrene, slightly modified cellulose fiber from Eucalyptus tree, coupling agent and lubricant in ratio 90:7:3:1. Polymer is melted mainly with friction, but some external heat can be used. Polymer, additives and fibers are mixed when they are moving through screw barrel. Melt compound is pressed through die plate. After cutting the pellets are cooled with water. Diameter and lengths of pellets are 3.6 mm and 6 mm correspondingly.

Example 6

In this example a material component, such as fiber material, is formed from the chemical pulp based starting material. The fiber material with low moisture content is mechanically and/or chemically modified.

The fiber material granulates are mixed with polymer based material, polyethylene, to form pellets. High density and low density fiber material granulates are used. High density means density, which is under 7% smaller than the theoretical density. Low density means density, which is 7-15% smaller than theoretical density.

Table 1 shows the pellet of the mixture comprising of polyethylene and cellulose fibers with different mass content of cellulose fibers.

TABLE 1

Moisture uptake of pellets in 50% RH and 22° C. atmosphere. Pellet moisture measured by weighting, %.
Pellet moisture, wt-%

| h | High density Fiber 50% | High density Fiber 40% | Lower density Fiber 20% | Lower density Fiber 30% | Lower density Fiber 40% | Competitor K Fiber 55% | Competitor S Wood 50% |
|---|---|---|---|---|---|---|---|
| 0 | 0.00 | 0.00 | 0.00 | 0.00 | 0.00 | 0.00 | 0.00 |
| 0.5 | 0.04 | 0.08 | 0.06 | 0.06 | 0.11 | 0.32 | 0.23 |
| 1 | 0.09 | 0.10 | 0.07 | 0.07 | 0.14 | 0.53 | 0.37 |
| 2 | 0.15 | 0.12 | 0.08 | 0.09 | 0.18 | 0.79 | 0.54 |
| 3 | 0.20 | 0.13 | 0.09 | 0.10 | 0.20 | 0.97 | 0.67 |
| 4 | 0.24 | 0.15 | 0.09 | 0.11 | 0.23 | 1.11 | 0.78 |
| 5 | 0.28 | 0.17 | 0.10 | 0.11 | 0.25 | 1.23 | 0.87 |
| 6 | 0.32 | 0.18 | 0.11 | 0.12 | 0.27 | 1.31 | 0.95 |
| 30 | 0.72 | 0.35 | 0.18 | 0.22 | 0.56 | 1.88 | 1.78 |

When the composite product includes the organic natural fiber material 40-60%, dry composite product absorbs moisture under 0.2%, preferably under 0.15 and more preferable under 0.1 from the weight of the composite product in the time 30 min (50% RH and 22° C. atmosphere). In one embodiment fiber content is 40-60%, 30 min; absorption under 0.2, preferably under 0.15 and more preferable under 0.1.

When the composite product includes the organic natural fiber material 20-40%, dry composite product absorbs moisture under 0.15% preferably under 0.13 and more preferable under 0.1 from the weight of the composite product in the time 30 min (50% RH and 22° C. atmosphere). In one embodiment fiber content is 20-40%, 30 min; absorption under 0.15, preferably under 0.13 and more preferable under 0.1.

When the composite product includes the organic natural fiber material 40-60%, dry composite product absorbs moisture under 0.9% preferably under 0.7 and more preferable under 0.5 from the weight of the compo-site product in the time 6 hours (50% RH and 22° C. atmosphere). In one embodiment fiber content is 40-60%, 6 h; absorption under 0.9, preferably under 0.7 and more preferable under 0.5.

When the composite product includes the organic natural fiber material 20-40%, dry compo-site product absorbs moisture under 0.8% preferably under 0.5 and more preferable under 0.3 from the weight of the compo-site product in the time 6 hours (50% RH and 22° C. atmosphere). In one embodiment fiber content is 20-40%, 6 h; absorption under 0.8, preferably under 0.5 and more preferable under 0.3.

When the composite product includes the organic natural fiber material 40-60%, dry compo-site product absorbs moisture under 1.5% preferably under 1.0 and more preferable under 0.8 from the weight of the compo-site product in the time 30 hours (50% RH and 22° C. atmosphere). In one embodiment fiber content is 40-60%, 30 h; absorption under 1.5, preferably under 1.0 and more preferable under 0.8.

When the composite product includes the organic natural fiber material 20-40%, dry compo-site product absorbs moisture under 1.3% preferably under 0.8 and more preferable under 0.5 from the weight of the compo-site product in the time 30 hours (50% RH and 22° C. atmosphere). In one embodiment fiber content is 20-40%, 30 h; absorption under 1.3, preferably under 0.8 and more preferable under 0.5.

From the results it can be discovered that in high density pellets fibers are well covered and thus sealed with polymer due to fact of low porosity (solid structure) and low specific surface area. Thus pellets are less sensitive for moisture uptake from atmosphere and are not so sensitive for open air storing of pellets after drying.

Example 7

This example discloses a method for making the density of the material.

A suitable process for making the density of the composite product is following. The components of the composite product are compounded with extruder equipped with pelletizer. The fiber materials are handled in such way that the moisture entering into the extruder is low and the fiber and polymer based materials are fed into the extruder in such way that the inclusion of air or other gases into the extruder with the materials is quite low. Here low means that the volume of air or other gases is below 5 volume percent. The extruder is designed to have sufficient venting in order to remove gaseous substances including water vapor, entrained air and other gases, and other volatile components. The pelletizing is done in such way that the moisture content of the material is quite low (below 0.5 weight percent) and the density of the material is quite high (less than 5 percent lower that the theoretical density).

Example 8

This example describes the theoretical/calculatory densities of composite products.

For example, the theoretical/calculatory density of a binary composite product comprising of polypropylene and cellulose fibers with densities of 0.91 g/cm³ and 1.5 g/dm³, respectively, can be calculated according to equation:

$$\rho_t = (m_{PP} + m_{cell}) / \left( \frac{m_{PP}}{\rho_{PP}} + \frac{m_{cell}}{\rho_{cell}} \right) \quad \text{Eq. (5)}$$

where $m_{PP}$ is the mass fraction of polypropylene and $m_{cell.}$ is the mass fraction of cellulose fibers in the binary composite product comprising of polypropylene and cellulose fibers and $\rho_{PP}$ is the density of polypropylene (0.91 g/cm³) and $\rho_{cell.}$ is the density of cellulose fiber wall (1.5 g/dm³). Table 2 shows the theoretical/calculatory density of a binary composite product comprising of polypropylene and cellulose fibers with different mass content of cellulose fibers.

TABLE 2

Theoretical/calculatory density of binary composite product comprising of polypropylene and cellulose fibers.

| Cellulose fiber content, mass % | Theoretical/ calculatory density, g/cm³ |
| --- | --- |
| 0 | 0.91 |
| 10 | 0.95 |
| 20 | 0.99 |
| 30 | 1.03 |
| 40 | 1.08 |
| 50 | 1.13 |
| 60 | 1.19 |
| 70 | 1.26 |
| 80 | 1.33 |
| 90 | 1.41 |
| 100 | 1.50 |

If the composite product comprises of a different thermoplastic polymer material than polypropylene or different fibers than cellulose fibers (it must be noted that all cellulose fibres do not have same density) or contain more than two components in addition to thermoplastic polymers and fibers, such as other polymers, additives, and inorganic and organic fillers, the theoretical/calculatory density is calculated from the masses and the densities of each individual components according to equation 5.

For example, the theoretical/calculatory density of a composite product comprising of polypropylene, cellulose fibers, and talcum with densities of 0.91 g/cm³, 1.5 g/cm³, and 2.7 g/cm³, respectively, can be calculated according to equation:

$$\rho_t = (m_{PP} + m_{cell} + m_{talcum}) / \left( \frac{m_{PP}}{\rho_{PP}} + \frac{m_{cell}}{\rho_{cell}} + \frac{m_{talcum}}{\rho_{talcum}} \right) \quad \text{Eq. (6)}$$

where $m_{PP}$ is the mass fraction of polypropylene, $m_{cell.}$ is the mass fraction of cellulose fibers, and $m_{talcom}$ is the mass fraction of talcum in the composite product comprising of polypropylene, cellulose fibers and talcum, and $\rho_{PP}$ is the density of polypropylene (0.91 g/cm³) and $\rho_{cell.}$ is the density of cellulose fiber wall (1.5 g/dm³), and $\rho_{PP}$ is the density of talcum (2.7 g/cm³). Table 3 shows the theoretical/calculatory density of a composite product comprising of polypropylene, cellulose fibers, and talcum with different mass content of cellulose fibers and fixed content of talcum of 10 mass percent.

TABLE 3

Theoretical/calculatory density of a composite product comprising of polypropylene, cellulose fibers, and talcum with different mass content of cellulose fibers and fixed content of talcum of 10 mass percent.

| Cellulose fiber content, mass % | Theoretical/ calculatory density, g/cm3 |
| --- | --- |
| 0 | 0.97 |
| 10 | 1.02 |
| 20 | 1.06 |
| 30 | 1.12 |
| 40 | 1.17 |
| 50 | 1.23 |
| 60 | 1.30 |
| 70 | 1.38 |
| 80 | 1.47 |
| 90 | 1.57 |

For example, the theoretical/calculatory density of a composite product comprising of another thermoplastic polymer, cellulose fibers, and talcum with densities of 1.24 g/cm³, 1.5 g/cm³, and 2.7 g/cm³, respectively, can be calculated according to equation:

$$\rho_t = (m_{tp} + m_{cell} + m_{talcum}) / \left( \frac{m_{tp}}{\rho_{tp}} + \frac{m_{cell}}{\rho_{cell}} + \frac{m_{talcum}}{\rho_{talcum}} \right) \quad \text{Eq. (7)}$$

where $m_{tp}$ is the mass fraction of a thermoplastic polymer, $m_{cell.}$ is the mass fraction of cellulose fibers, and $m_{talcom}$ is the mass fraction of talcum in the composite product comprising of a thermoplastic polymer, cellulose fibers and talcum, and $\rho_{tp}$ is the density of another thermoplastic polymer (1.24 g/cm³) and $\rho_{cell.}$ is the density of cellulose fiber wall (1.5 g/dm³), and $\rho_{PP}$ is the density of talcum (2.7 g/cm³). Table 4 shows the theoretical/calculatory density of a composite product comprising of a thermoplastic polymer, cellulose fibers, and talcum with different mass content of cellulose fibers and fixed content of talcum of 10 mass percent.

TABLE 4

Theoretical/calculatory density of a composite product comprising of a thermoplastic polymer, cellulose fibers, and talcum with different mass content of cellulose fibers and fixed content of talcum of 10 mass percent.

| Cellulose fiber content, mass % | Theoretical/ calculatory density, g/cm3 |
| --- | --- |
| 0 | 1.31 |
| 10 | 1.34 |
| 20 | 1.36 |
| 30 | 1.39 |
| 40 | 1.41 |
| 50 | 1.44 |

TABLE 4-continued

Theoretical/calculatory density of a composite
product comprising of a thermoplastic polymer,
cellulose fibers, and talcum with different mass
content of cellulose fibers and fixed content of
talcum of 10 mass percent.

| Cellulose fiber content, mass % | Theoretical/ calculatory density, g/cm3 |
|---|---|
| 60 | 1.47 |
| 70 | 1.50 |
| 80 | 1.54 |
| 90 | 1.57 |

A composite product can be characterized by its theoretical/calculatory density and its experimental density. The experimental density of the material can be measured with several techniques including standard methods for determination of density of plastics, such as EN ISO 1183-1, ISO 1183-2, ISO 1183-3:2004, and their counterparts in other standards organizations. The experimental density of the material can be measured also with other methods, such as laboratory and on-line density sensors and float/sink tests with different liquids of given density. In addition, density of a composite material can be determined, for example, by compressing a sample of a composite material at elevated temperature and by applying vacuum at the same time, and thereafter by measuring the density of the formed pressed and cooled sample material by methods such as ISO 1183-1, ISO 1183-2, ISO 1183-3, and their counterparts in other standards organizations, laboratory and on-line density sensors, and float/sink tests with different liquids of given density.

A composite product can be characterized by its theoretical/calculatory density and its experimental density. Alternatively, a composite product can be characterized by its pore volume which can be related to the experimental density of the material. Pore volume can be indirectly determined by methods used for determination of density such as EN ISO 1183-1, ISO 1183-2, ISO 1183-3:2004, and their counterparts in other standards organizations, laboratory and on-line density sensors and float/sink tests with different liquids of given density, and by compressing a sample of a composite material at elevated temperature and by applying vacuum at the same time, and thereafter by measuring the density of the formed pressed and cooled sample material by methods such as ISO 1183-1, ISO 1183-2, ISO 1183-3, and their counterparts in other standards organizations, laboratory and on-line density sensors, and float/sink tests with different liquids of given density. A composite product can be characterized by its theoretical/calculatory density and its experimental density. Alternatively, a composite product can be characterized by its pore volume. Pore volume can be directly determined by methods employed for porosity measurements, such as computed tomography methods, water saturation and water evaporation methods, and thermoporosimetry. Pore volume can be determined directly, indirectly, and by their combinations.

A composite product can be characterized by its theoretical/calculatory density and its experimental density. Theoretical/calculatory density of a composite product is calculated from the masses and the densities of each individual component according to equation 1. The calculation of the theoretical/calculatory density of a composite product requires knowledge of the composition of the composite product. When the composition of the composite product is unknown several analysis methods can be used for determination of the composition of the composite product. Analysis methods suitable for determination of the composition of an unknown component include, but are not limited to, physical, chemical, thermal, optical, and microscopy analysis techniques. The composition of an unknown composite product can be analyzed, for example, with thermogravimetric, calorimetric, spectroscopic, and microscopic analysis, and by selectively dissolving the different components comprising the unknown composite product in order to resolve the components and the mass fraction of the components comprising the unknown composite product.

Example 9

This example discloses a method for making the density of the material.

A suitable process for making the density of the composite product is following. The components of the composite product are compounded with extruder equipped with pelletizer. The fiber materials are handled in such way that the moisture entering into the extruder is low and the fiber and polymer based materials are fed into the extruder in such way that the inclusion of air or other gases into the extruder with the materials is low. Here low means that the volume of air or other gases is below 1 volume percent. The extruder is designed to have sufficient venting in order to remove gaseous substances including water vapor, entrained air and other gases, and other volatile components. The pelletizing is done in such way that the moisture content of the material is low (below 0.3 weight percent) and the density of the material is high (less than 3 percent lower that the theoretical density).

Example 10

This example discloses a method for making the density of the material.

A suitable process for making the density of the composite product is following. The components of the composite product are compounded with extruder equipped with pelletizer. The fiber materials are handled in such way that the moisture entering into the extruder is low and the fiber and polymer based materials are fed into the extruder in such way that the inclusion of air or other gases into the extruder with the materials is very low. Here low means that the volume of air or other gases is below 0.5 volume percent. The extruder is designed to have sufficient venting in order to remove gaseous substances including water vapor, entrained air and other gases, and other volatile components. The pelletizing is done in such way that the moisture content of the material is very low (below 0.1 weight percent) and the density of the material is very high (less than 1 percent lower that the theoretical density).

Example 11

This example discloses a method for making the density of the material.

A suitable process for making the density of the composite product is following. The components of the composite product are compounded with co-rotating twin screw extruder equipped with underwater pelletizer. The fiber materials are handled in such way that the moisture entering into the extruder is low and the fiber and polymer based materials are fed from main and side feeding sections with forcing feeders into the extruder in such way that the inclusion of air or other gases with the materials is low. The extruder is designed to have sufficient venting in order to remove gaseous substances including water vapor, entrained air and other gases, and other volatile components. The underwater pelletizing is done in such way that the moisture content of the material is low and the density of the material is high.

Example 12

This example discloses a method for making the density of the material.

A suitable process for making the density of the composite product is following. The components of the composite product are compounded with co-rotating twin screw extruder equipped with underwater pelletizer. The fiber materials are handled in such way that the moisture entering into the extruder is low and the fiber and polymer based materials are fed from main and side feeding sections with forcing feeders into the extruder in such way that the inclusion of air or other gases with the materials is low. The extruder is designed to have sufficient venting in order to remove gaseous substances including water vapor, entrained air and other gases, and other volatile components. The underwater pelletizing is done in such way that the moisture content of the material is low and the density of the material is high.

Example 13

In this example flake like material is formed.

Piece of sheet made of birch cellulose fibers is grinded with abrasive media like sandpaper to cut small pieces from the sheet. The sheet is grinded on top side of sheet so that grinding is done mostly on the sides of fibres or fibre bundles. The cellulose sheet movement is controlled by supporting frame and feeding system till the end of grinding. This grinded material is screened or classified to separate unsuitable material from the suitable flake like cellulose. The accepted material contains certain particle size distribution as well as particle shape distribution.

Example 14

In this example flake like material is formed.

Piece of sheet made of conifer cellulose fibres is grinded with abrasive media like sandpaper to cut small pieces from the sheet. The sheet is grinded on the edge of the sheet so that grinding is done mostly on cross sections of fibres or fibre bundles. This grinded material is screened or classified to separate unsuitable material from the suitable flake like cellulose. The accepted material contains certain particle size distribution as well as particle shape distribution.

Example 15

In this example flake like material is formed.

Piece of sheet made of eucalyptus cellulose fibres are shredded with cutting media like knifes to cut various sizes of pieces from the sheet. The shredder has sieve of 3 mm holes, which determinates the maximum size of material. The formed material contains very large particle size distribution, thus the material contains also very fine dust and flake like material. The shredded material is screened or classified to separate unsuitable material from the suitable flake like cellulose. The accepted material contains certain particle size distribution as well as particle shape distribution.

Example 16

In this example flake like material is formed.

Piece of sheet made of beech cellulose fibres are shredded with cutting media like knifes in two steps to cut various sizes of pieces from the sheet. The first shredder has sieve of 40 mm holes, which determinates the maximum size of material at that point. The material is conveyed to $2^{nd}$ machine, which has sieve size of 3 mm. The formed material contains very large particle size distribution, thus the material contains also very fine dust and flake like material. The shredded material is screened or classified to separate unsuitable material from the suitable flake like cellulose. The accepted material contains certain particle size distribution as well as particle shape distribution.

Example 17

In this example flake like material is formed.

A grinding machine with abrasive belt P220 (average size=68 μm) is used to grind piece of sheet made of conifer cellulose fibres. The sheet is grinded on the top of the sheet so that grinding is done mostly on side of fibres or fibre bundles. This grinded material is screened or classified to separate unsuitable material from the suitable flake like cellulose. The accepted material contains certain particle size distribution as well as particle shape distribution.

Example 18

In this example flake like material is formed.

A cutting machine for pulp or paper can be used to grind conifer cellulose. The slitter for pulp or paper produces smaller cellulose pieces. This material contains fibres or fibre bundles. This grinded material is screened or classified to separate unsuitable material from the suitable flake like cellulose. The accepted material contains certain particle size distribution as well as particle shape distribution.

Example 19

In this example flake like material is formed.

Piece of sheet made of birch cellulose fibres are shredded with cutting media like knifes to cut various sizes of pieces from the sheet. The shredder has sieve of 3 mm holes, which determinates the maximum size of material. The formed material is fed to disk refiner to further grind material. The shredded material may be screened or classified to separate unsuitable material from the suitable flake like cellulose. The accepted material contains certain particle size distribution as well as particle shape distribution.

Example 20

In this example flake like material is formed.

Piece of sheet made of eucalyptus cellulose fibres are shredded with cutting media like knifes to cut various sizes of pieces from the sheet. The shredder has sieve of 3 mm holes, which determinates the maximum size of material. The shredded material is fed to the extruder with suitable screw geometry. This grinded material is screened or classified to separate unsuitable material from the suitable flake like cellulose. The accepted material contains certain particle size distribution as well as particle shape distribution.

Example 21

In this example flake like material is formed.

Paper made of cellulose fibres are shredded with cutting media like knifes to cut various sizes of pieces from the sheet. The shredder has sieve of 8 mm holes, which determinates the size of material. The shredded material is fed to the extruder with suitable screw geometry. This grinding process can be repeated, in order to obtain to obtain flakes with suitable particle size distribution as well as particle shape distribution. Screening or classifying process may be needed to separate unsuitable material from the suitable flake like cellulose.

Example 22

In this example flake like material is formed.

Shredded cellulose material with moisture content of 15 wt-% is fed to the extruder with suitable screw geometry. Material is dried during grinding process. This grinding process can be repeated, in order to obtain to obtain flakes with suitable particle size distribution as well as particle shape distribution. Screening or classifying process may be needed to separate unsuitable material from the suitable flake like cellulose.

Example 23

In this example, which is shown in FIG. 1, a composite product is formed from organic starting material (1) and polymer based material (2). The organic natural starting material is pulp based material. Polymer based material is polyethylene.

The organic natural starting material is crushed (3) by a grinding method selected from the group consisting of crushing-based grinding, attrition-based grinding, abrasion-based grinding, cutting-based grinding, blasting-based grinding, explosion-based grinding, wet grinding, dry grinding, grinding under pressure and their combinations. In one embodiment the starting material is crushed by a crushing-based grinding. In one embodiment the starting material is crushed by a cutting grinding. Preferably, the starting material is crushed so that wherein fibers are separated and cut from the organic natural starting material. In one embodiment the grinding device used for grinding the starting material is selected from the group consisting of impact mill, air jet mill, sand mill, bead mill, pearl mill, ball mill, vibration mill, screw mill and their combinations. The grinding can be made in one or more grinding steps by one or more grinding methods. In one embodiment the fiber material is formed by grinding a starting material in one or more steps. Preferably the organic natural starting material (1) is crushed (3) by cutting grinding.

The fibers (4) of organic natural starting material (1) are mixed with polymer-based material (2) without compression to form a mixture (5). The composite product (7) is formed from the mixture by an extrusion stage (6). The composite product is in the form of granulates.

A final product (7) is formed from the composite product granulates, e.g. by an additional extrusion step.

Example 24

In this example flake like material is formed.

The cellulose material with moisture content below 50 wt-% is fed to the extruder with suitable screw geometry. Material is dried during grinding process. This grinding process can be repeated, in order to obtain to obtain flakes with suitable particle size distribution as well as particle shape distribution. Screening or classifying process may be needed to separate unsuitable material from the suitable flake like cellulose.

Example 25

In this example flake like material is formed.

The cellulose material with moisture content 50 wt-% or above is fed to the extruder with suitable screw geometry. Material is dried during grinding process. This grinding process can be repeated, in order to obtain to obtain flakes with suitable particle size distribution as well as particle shape distribution. Screening or classifying process may be needed to separate unsuitable material from the suitable flake like cellulose.

Example 26

In this example starting material is grinded to form flake-form fibre material so that suitable fine fibre fragments are achieved. Then suitable fine fibre fragments are treated with small amount of liquid which contains chemicals to aid fragments to agglomerates and later improving dispersion in the compound. With mechanical assistant big proportion of particles gets flake like form.

Example 27

In this example cellulose-based starting material is grinded to form flake-form fibre material. Sphericity of the flakes is less than 0.2. More preferable it is less than 0.1. Reinforcement potential is higher and then also mechanical properties are improved compared to composite which has material with high sphericity.

Examples of fine flake material is represented in table 5.

TABLE 5

| | Sample 1 | Sample 2 | Sample 3 | Sample 4 | Sample 5 | Sample 6 | Sample 7 |
|---|---|---|---|---|---|---|---|
| Longest dimension of the particle (dL), mm | 0.49 | 0.25 | 0.60 | 1.10 | 3.20 | 0.42 | 0.29 |
| Width of particle (dI), μm | 13.0 | 14.0 | 13.0 | 490 | 610 | 16.0 | 23.0 |
| Shortest dimension of the particle (dS), μm | 2.5 | 7 | 11 | 22 | 88 | 2.7 | 6.1 |

TABLE 5-continued

|  | Sample 1 | Sample 2 | Sample 3 | Sample 4 | Sample 5 | Sample 6 | Sample 7 |
|---|---|---|---|---|---|---|---|
| Sphericity (1) | 0.05 | 0.12 | 0.07 | 0.21 | 0.17 | 0.06 | 0.12 |
| Shape factor (2) | 0.03 | 0.12 | 0.12 | 0.03 | 0.06 | 0.03 | 0.07 |
| Aspect ratio (dL/dS) (3) | 196 | 36 | 55 | 50 | 36 | 156 | 48 |

Figure 6:
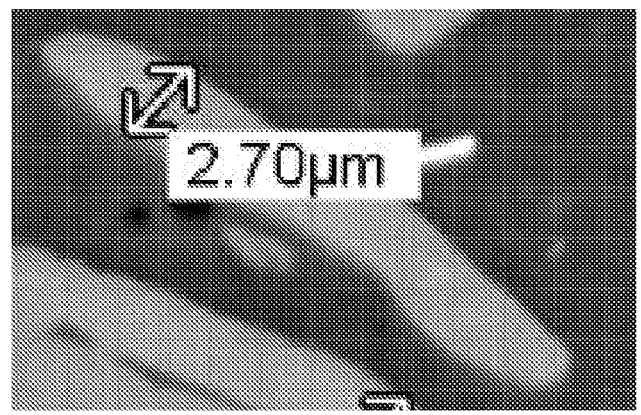
FIG. 6 represents an example of shortest dimension of a small flake.
Figure 7:
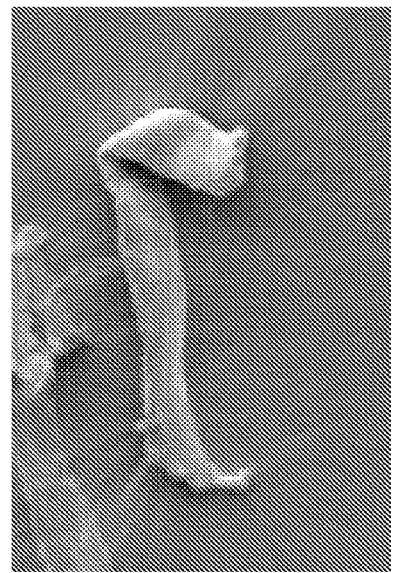
FIG. 7 represents an example of a small, elongated flake (SEM image).

Examples of fine flake is represented in FIGS. 6 and 7.

The material components and composite products according to the present invention are suitable in different embodiments to be used in different final products. The method according to the present invention is suitable in different embodiments to be used for manufacturing the most different kinds of composite products.

The invention is not limited merely to the example referred to above; instead many variations are possible within the scope of the inventive idea defined by the claims.

The invention claimed is:

1. A composite product wherein the composite product comprises a thermoplastic polymer based material mixed with an organic natural fiber material formed from a chemical pulp based material made from wood, the organic natural fiber material having a form of a flake, wherein
the thickness of the flake is under 30 μm and the width of the flake is at least 2 times the thickness of the flake, and
when dry, the composite product absorbs moisture under 1.5% by weight of the composite product when the composite product includes the organic natural fiber material in a range of 40-60% by weight, or the dry composite product absorbs moisture under 1.3% by weight of the composite product, when the composite product includes the organic natural fiber material in a range of 20-40% by weight, in a time of 30 hours in an atmosphere of 50% relative humidity and a temperature of 22° C.

2. The composite product according to claim 1, wherein the flake contains at least fragments of fiber.

3. The composite product according to claim 1, wherein shape factor of the flake is between 0.05 and 0.09.

4. The composite product according to claim 1, wherein aspect ratio relating to ratio of the length to the width is between 10 and 40.

5. The composite product according to claim 1, wherein aspect ratio relating to ratio of the length to the thickness is between 50 and 100.

6. The composite product according to claim 1, wherein sphericity is less than 0.2.

7. The composite product according to claim 1, wherein the width of the flake is under 500 μm.

8. The composite product according to claim 1, wherein the length of the flake is at least 10 times the width of the flake.

9. The composite product according to claim 1, wherein fiber bulk density of the fiber material is under 300 kg/m³.

10. The composite product according to claim 1, wherein the composite product is in the form of granulates.

11. A method for manufacturing a composite product comprising:
mixing a thermoplastic polymer based material and an organic natural fiber material formed from chemical pulp based material made from wood to form the composite product, the organic natural fiber material having a form of a flake, wherein
the thickness of the flake is under 30 μm and the width of the flake is at least 2 times the thickness of the flake, and
when dry, the composite product absorbs moisture under 1.5% by weight of the composite product when the composite product includes the organic natural fiber material in the range of 40-60% by weight, or the dry composite product absorbs moisture under 1.3% by weight of the composite product, when the composite product includes the organic natural fiber material in the range of 20-40% by weight, in a time of 30 hours in an atmosphere of 50% relative humidity and a temperature of 22° C.

12. The method according to claim 11, wherein the organic natural fiber material is formed from an organic natural starting material by crushing before the mixing.

13. The method according to claim 11, wherein the composite product is formed by the granulation in order to form the composite product in the form of granulates.

14. A material component formed organic natural starting material containing cellulose, wherein the material component is formed fiber material, which is formed from the organic natural starting material by crushing and which is mainly in the form of flakes after crushing, wherein the thickness of the flake is under 30 μm and the width of the flake is at least 2 times the thickness of the flake.

15. A final product, wherein the final product is formed from the composite product according to claim 1.

16. The final product according to claim 15, wherein the final product is formed from the granulates of the composite product.

* * * * *